(No Model.) 2 Sheets—Sheet 1.
A. L. ALLEN.
APPARATUS FOR THE MANUFACTURE OF GAS.
No. 310,487. Patented Jan. 6, 1885.
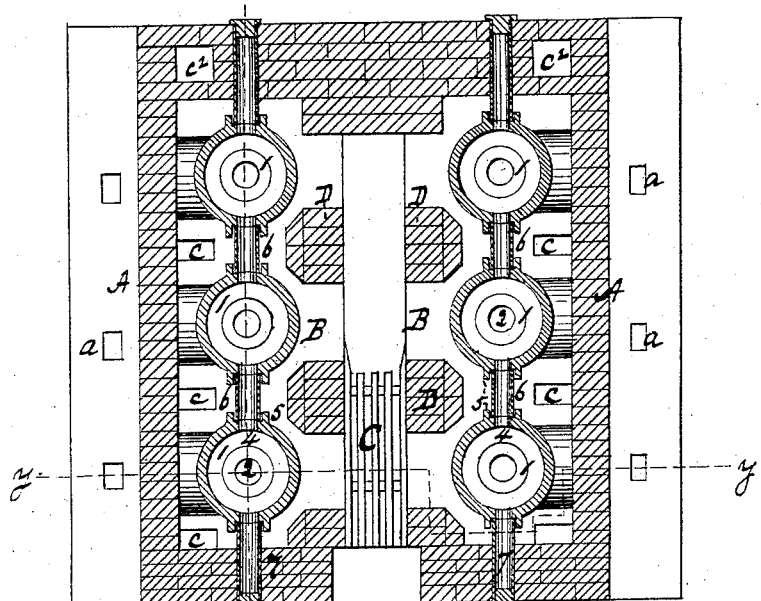
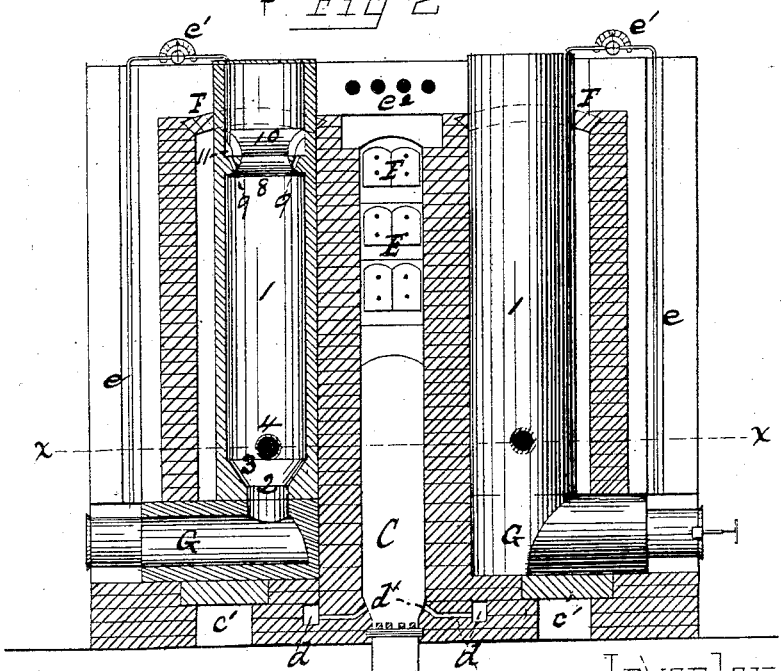

(No Model.) 2 Sheets—Sheet 2.
A. L. ALLEN.
APPARATUS FOR THE MANUFACTURE OF GAS.
No. 310,487. Patented Jan. 6, 1885.
Fig. 3.
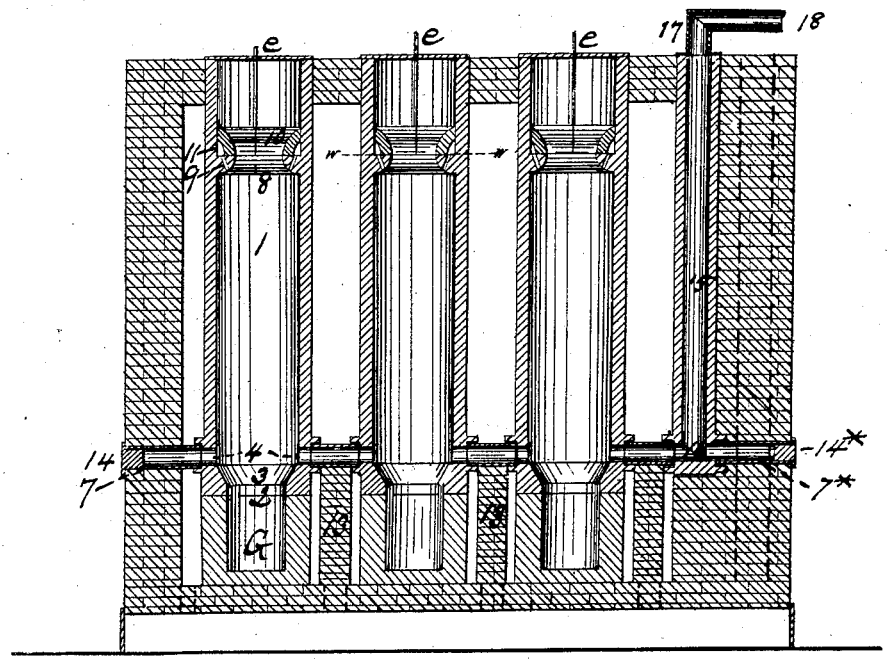
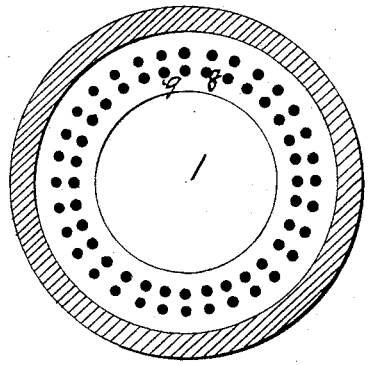
Fig. 4.
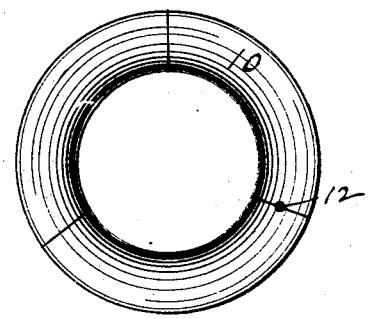
Fig. 5.
Witnesses
Geo. A. Tayberschmidt.
H. B. Moulton
Inventor
Augustus L. Allen
by F. W. Ritter, Jr.
Atty

UNITED STATES PATENT OFFICE.

AUGUSTUS L. ALLEN, OF POUGHKEEPSIE, NEW YORK.

APPARATUS FOR THE MANUFACTURE OF GAS.

SPECIFICATION forming part of Letters Patent No. 310,487, dated January 6, 1885.

Application filed July 11, 1884. (No model.)

*To all whom it may concern:*

Be it known that I, AUGUSTUS L. ALLEN, a citizen of the United States, residing at Poughkeepsie, in the county of Dutchess and State of New York, have invented certain new and useful Improvements in Apparatus for the Manufacture of Gas; and I hereby declare the following to be a full, clear, and exact description of the same, reference being had to the accompanying drawings, in which—

Figure 1 is a horizontal section of a furnace and bench of vertical retorts on the line $x\ x$ of Fig. 2. Fig. 2 is a vertical section of the same on the line $y\ y$ of Fig. 1. Fig. 3 is a vertical section on the line $z\ z$ of Fig. 1. Fig. 4 is a transverse section of a retort on the line $w\ w$ of Fig. 3, the detachable ring which forms the steam-chamber being removed to show the perforated ring-shelf of the retort; and Fig. 5 is a detached view of the separable ring which forms the steam-chamber in the upper part of the retort.

Like letters refer to like parts wherever they occur.

My present invention relates to certain improvements in the construction, setting, and combination of vertical retorts for the manufacture of hydrogen and carbonic oxide or water gas, by what is known as the "Allen-Harris" or "American" hydrocarbon process, and by kindred processes which, generally stated, consist in the manufacture of heating and illuminating gas by decomposing steam in the presence and by means of incandescent carbonaceous matter, the gas so produced being subsequently carbureted by means of hydrocarbon liquids or vapors when a higher illuminating quality is desired.

The first feature of the invention consists in providing a steam-chamber in the upper part or head of the retort, whence the steam is delivered in a divided state into the upper and fresher portions of the carbonaceous charge, moving thence toward and through the older and highly incandescent portion thereof, and carrying with it the vapors and gases given off from the fresh charge, which has a tendency to accumulate in the upper portion of vertical retorts, and finally escaping from the retort at the hottest part thereof, whereby a purer and more permanent gas is obtained.

The second feature of the invention consists in connecting the bases of two or more retorts with each other at the fire-level, or near the hottest point of the retorts, by connecting branches leading directly to the main, so that the gas in passing to the main from the hottest portion of the retort in which it is generated must pass continuously through one or more masses of incandescent carbon of substantially uniform temperature, whereby a fixed gas is obtained with or without the use of superheaters.

The third feature of the invention consists in combining with two or more vertical retorts, which are connected by cross or branch pipes, one or more clearance and inspection pipes, which extend through the wall or walls of the furnace, and are arranged in line with the branch pipe or pipes, which connect the retorts, whereby the retorts may be inspected, obstructions removed, and the uniform operation of the retorts insured.

Besides these prominent features there are further novel features which will hereinafter more fully appear.

I will now proceed to describe my invention more specifically, so that others skilled in the art to which it appertains may apply the same.

In the drawings, A indicates the outer walls of the furnace, having benches B for the reception of the retort-bases, upon which rest a series of vertical retorts.

C indicates a fire-chamber arranged between the benches, whence the products of combustion, after heating the vertical retorts, pass by the downdraft-flues $c$ to the collecting-flues $c'$, which extend from the front to the rear under the retort-benches, and finally escape to the stack by the main flues $c^2$. On the benches next to the fire-chamber, and opposite the intervals between the retorts, are a series of pillars, D, which support the steam-superheaters E, and the independent arches F, which latter inclose the separate retorts, and combined form the crown or arch of the furnace. Parallel with the grate of fire-chamber C are the air-flues $d$, for heating the draft-air which supports combustion as it is delivered to the fire-chamber just above the grate through the tuyeres $d'$.

In the outer walls, A, of the furnace are a series of flues, $a$, for the reception of the steam-pipes $e$, which latter are connected with and receive superheated steam from the superheaters E and deliver it into the steam-chambers in the upper part of the vertical retorts. These pipes $e$ may be provided with index-valves $e'$, in order to regulate the volume of steam passing therethrough.

$e^2$ indicates a series of independent steam-superheating pipes, which may be placed in the crown or arch of the furnace, as ready access may be had thereto with little displacement of the brick-work, and may be connected with the superheated-steam pipes $e$, if desired.

G indicates independent detachable retort-bases, which rest upon the retort-benches B, project through the furnace-walls A, so as to be removed and replaced without materially disturbing the furnace-walls, support the vertical retorts, and communicate therewith, so as to receive the ashes, &c., therefrom.

A more complete description of the devices and construction thus far described will be found in the application of Harris and Allen, Serial No. 116,361, filed January 3, 1884, and the same is not herein claimed, as it forms the subject-matter of said application. As experience has proved such construction and arrangement of the devices are admirably adapted for the purposes intended, I have chosen them for purposes of illustration, in connection with my improvements, in order that the latter may be fully understood; but inasmuch as such construction and arrangement do not modify my invention and are not essential thereto, I do not limit myself thereto, proposing to use any construction upon which my improvements, hereinafter set forth, may be engrafted.

1 indicates a vertical retort having an opening below, as at 2, for the discharge of the ashes and débris, and preferably provided with a sloping shoulder, 3, to support the charge of incandescent carbon, and direct the ash and cinder to the discharge-opening 2. On opposite sides of the retort, just above the discharge-opening 2, so as to be at or near the hottest part of the retort, are gas-ports 4, surrounded on the exterior of the retort by bells or sockets 5, for the reception of branch or connecting pipes 6, and inspection and clearing pipes 7. In the upper part of the retort is an annular inwardly-projecting shoulder or shelf, 8, preferably flat or concaved on its upper surface, and having numerous small perforations, 9, (say one-fourth inch in diameter) projecting downward, so as to deliver into the charge of carbon in the retort below the shelf or shoulder 8. This shelf or shoulder may be integral with the retort 1, or may be detachable therefrom and supported therein by any suitable means. In order to obtain strength, I prefer to slope it off on its under surface, as shown in the drawings. Upon this shelf 8 is placed the annular detachable tile 10, which may be in one or more pieces, as desired. The tile 10 is cupped or concave on its under surface, so as to form with the shelf or shoulder 8 and side of the retort, when in position, the steam-chamber 11, is perforated, as at Fig. 12, for the passage of the superheated-steam pipe $e$, and by preference is curved or convex on its upper surface, so as to prevent lodgment of the charge of coal, which is introduced through the top of the retort.

In setting the retorts, the adjacent retorts are connected by the pipes 6, which may be of circular, oval, or other form in cross-section, and the ends of said pipes, when inserted in the bells or sockets 5, are luted or cemented to form a tight joint. The pipes 6 may be supported by short pillars 13 of brick-work resting on the bench B, between the retort-bases G, or in other suitable manner when found necessary.

In line with the connecting-pipes 6 is an inspection-pipe, 7, which is supported in and projects through the furnace-wall A, its outer end being closed when not in use by a plug, 14.

15 indicates a vertical flue or conduit, which has at its lower end and side of the retort an elbow integral or detachable therefrom, one or two openings, 16, and corresponding bells, and at its upper end a mouth-piece, 17, and pipe 18, to conduct the gas formed in the retorts 1, to carbureting-retorts, or to a point of utilization or storage, as the case may be. The internal diameter of this flue or conduit will depend on the number of retorts in the bench and the volume of gas passing therethrough. It is set either in the rear part of the furnace or in the rear wall thereof, or partly in the furnace-chamber and partly in the rear wall, but in either case should be suitably supported by masonry, to prevent injury thereto. The conduit 15 is connected with the last retort of the series by an elbow or T, or a branch pipe 6, secured and luted, or cemented, as hereinbefore specified, and when no inspection or clearance pipe is desired a single opening or port, 16, will suffice; but where an inspection-pipe is desired it is formed with two openings, 16, opposite to or at right angles with each other, as before specified, and a second inspection and clearing pipe, 7*, is passed through the rear or side wall of the furnace and closed by a plug, 14*.

The apparatus being constructed substantially as hereinbefore specified, will be operated as follows: The retorts 1 are charged with anthracite coal or other carbonaceous material to be employed in decomposing the steam, and a fire is started in the fire-chamber C, in order to bring the superheaters E and retorts 1 to the proper temperature. As soon as the proper temperature is reached and the charge of coal or carbon in the retorts is incandescent, the superheated steam from pipe $e$ is admitted into steam-chamber 11, and is projected thence in fine streams into the carbonaceous matter in the upper part of the retort, unites with any gases generated by the coal, passes downward through the incandescent coal to the bottom or hottest part of the retort, being thoroughly decomposed, and escapes through branch pipe 6 into the incandescent mass in the bottom or hottest part of the second retort, where it unites with the gas from said retort, and passes through second pipe 6 into a like incandescent mass in the bottom of the third retort of the series, and so on until it reaches the conduit or flue 15, whence it passes by pipe 18 to carbureting-retorts, (of any approved or well-known character,) or directly to the point of storage or utilization, as the case may be.

Attention is called to the fact that by my method the superheated steam enters the retort where the temperature is lowest, the carbonaceous charge comparatively fresh or least prepared for use, and at that part of the retort where imperfect gases tend to accumulate it gathers such gases and passes therewith through the incandescent mass in the retort to the hottest part thereof, and at such point escapes from the retort and passes through one or more separate masses of incandescent carbon, substantially equal in temperature to the last temperature to which it was subjected before leaving the retort in which the steam was decomposed and the gas formed. This method differs materially from that wherein the steam is introduced at the top of one retort, descends to the bottom thereof, and then passes to another retort, wherein it ascends or descends, as in such a process the decomposed steam and gases are subjected alternately to higher and lower or constantly varying temperatures, and, coming in contact with the impure half-formed gases in the tops of retorts, carry them along with the permanent fixed gases to the main. Moreover, I am enabled to make the transfer of the gases at the bottom or hottest portion of the retorts, and thus avoid the use of connecting-pipes, elbows, and crosses on top of the bench where asbestus and other coverings are required to prevent condensation, and where the valves will become oxidized and require frequent renewal.

Having thus set forth the nature, operation and advantages of my invention, what I claim, and desire to secure by Letters Patent, is—

1. The method herein described for the manufacture of gas, which consists in passing a current of steam or superheated steam continuously through a mass of highly-heated carbon of gradually-increasing temperature, and finally through one or more independent masses of incandescent carbon of equal temperature with the final temperature of the decomposing-retort, substantially as and for the purposes specified.

2. In apparatus for the manufacture of gas, the combination of two or more vertical decomposing-retorts, each provided at its upper end with a steam-distributer, said retorts arranged in series and connected below with each other, and one of said retorts provided with a conduit which leads from the bottom or hottest part of said retort directly to the point of carburation or storage, so that the gas from the first retort shall pass across and through the lower or hottest part of the second retort on its way to the main, or to a carbureting-retort, substantially as and for the purposes specified.

3. In apparatus for the manufacture of gas, the combination of two or more vertical decomposing-retorts connected below by a cross-pipe or connection, and an inspection or clearance pipe which communicates with one of said retorts in line with the cross or connecting pipe and projects through the furnace-walls, substantially as and for the purpose specified.

4. In apparatus for the manufacture of gas, the combination, with a vertical retort having a steam-distributer at its upper end and a gas-exit at its lower end, of a gas conduit or flue arranged vertically in the furnace and having an elbow or horizontal pipe connection with the gas-exit of the retort, substantially as and for the purpose specified.

5. In apparatus for the manufacture of gas, the combination, in a furnace, of two or more vertical retorts, each having a steam-distributer in its upper end and a gas-exit near its bottom, said retorts arranged in series, the adjacent retorts connected by their gas-exits, gas-conduit connected with the gas-exit of the last retort of the series, and inspection-pipes which are arranged in line with the retort-connections, project through the furnace-walls, and connect the one with the first retort of the series and the other with the gas-flue, substantially as and for the purpose specified.

6. A vertical gas-retort having in its upper end a perforated annular steam-chamber, substantially as and for the purposes specified.

7. The combination, with a vertical gas-retort having an annular perforated shelf in its upper end, of a detachable annular ring having a concave face and side to form with the shelf and side of the retort a steam-chamber in the upper part of the retort, substantially as and for the purposes specified.

8. A vertical gas-retort having a perforated or open bottom, and two openings or ports diametrically opposite and at points just above the bottom of the retort, substantially as and for the purposes specified.

9. A vertical gas-retort having a perforated steam-chamber, 11, in its upper end, an open bottom, and a gas-exit, 4, provided with the bell 5, substantially as and for the purposes specified.

In testimony whereof I affix my signature, in presence of two witnesses, this 9th day of July, 1884.

AUGUSTUS L. ALLEN.

Witnesses:
JAMES M. HADDEN,
G. ADDISON TALMAGE.